(12) United States Patent
Ergen et al.

(10) Patent No.: US 8,849,275 B2
(45) Date of Patent: Sep. 30, 2014

(54) METHOD AND APPARATUS FOR LOAD BALANCING IN A WIRELESS COMMUNICATION NETWORK

(75) Inventors: Mustafa Ergen, Oakland, CA (US); Pawan Uberoy, Milpitas, CA (US); Tony Mak, San Francisco, CA (US); Rehan Jalil, San Jose, CA (US)

(73) Assignee: Wichorus Inc., San Jose, CA (US)

( * ) Notice: Subject to any disclaimer, the term of this patent is extended or adjusted under 35 U.S.C. 154(b) by 591 days.

(21) Appl. No.: 12/208,350

(22) Filed: Sep. 11, 2008

(65) Prior Publication Data

US 2009/0069004 A1     Mar. 12, 2009

Related U.S. Application Data

(60) Provisional application No. 60/993,315, filed on Sep. 11, 2007.

(51) Int. Cl.
*H04W 4/00* (2009.01)
*H04W 36/22* (2009.01)
*H04M 3/36* (2006.01)

(52) U.S. Cl.
CPC ............ *H04W 36/22* (2013.01); *H04M 3/367* (2013.01)
USPC ........... 455/431; 455/560; 455/436; 370/331; 370/254

(58) Field of Classification Search
USPC ................................. 455/431, 560, 427–430
See application file for complete search history.

(56) References Cited

U.S. PATENT DOCUMENTS

| | | | |
|---|---|---|---|
| 2004/0001461 A1* | 1/2004 | Lohtia et al. | 370/331 |
| 2007/0259692 A1* | 11/2007 | Venkatachalam | 455/560 |
| 2008/0125126 A1* | 5/2008 | Fang et al. | 455/436 |
| 2008/0232272 A1* | 9/2008 | Gelbman et al. | 370/254 |

\* cited by examiner

*Primary Examiner* — Gerald Johnson
(74) *Attorney, Agent, or Firm* — Hamilton, Brook, Smith & Reynolds, P.C.

(57) ABSTRACT

A method, system, and apparatus for communication in wireless communication network having an Access Service Network-controller (ASN-controller) communicating with plurality of Base Stations (BSs). The method includes reading one or more reports of plurality of reports received from the plurality of BSs. The plurality of reports comprise spare capacity information of one or more BSs of the plurality of BSs. The method further includes generating one or more directions based on the one or more reports to perform load balancing.

20 Claims, 6 Drawing Sheets

METHOD AND APPARATUS FOR LOAD BALANCING IN A WIRELESS COMMUNICATION NETWORK

RELATED APPLICATIONS

Benefit is claimed under 35 U.S.C. 119(e) to U.S. Provisional Applications Ser. No. 60/993,315 entitled "Method and Apparatus for communication in wireless communication network" by Mustafa Ergen et al., filed on 11 Sep. 2007, which is herein incorporated in its entirety by reference for all purposes.

FIELD OF THE INVENTION

The invention generally relates to a wireless communication network. More specifically, the invention relates to method, system, and apparatus for communication in the wireless communication network.

BACKGROUND OF THE INVENTION

In a wireless communication network such as a Worldwide Interoperability for Microwave Access (WiMAX) communication network, an Access Service Network (ASN) forms the radio access network. The ASN includes one or more ASN-controllers and a plurality of Base Stations (BSs). The plurality of BSs further communicate with a plurality of Mobile Stations (MSs). Each ASN-controller interfaces with one or more BSs in the ASN. The ASN enables functions such as Radio Resource Management (RRM), load balancing and Handover Management (HOM) for efficient communication in the wireless communication network.

In RRM, parameters related to radio transmission between the one or more BSs are controlled. These parameters for example, can be, transmitting power, channel allocation, load balancing criteria, handover criteria, modulation scheme and error coding scheme. RRM enables effective utilization of the radio spectrum and network resources during communication in a wireless communication network. On the basis of RRM and requirements in the wireless communication network, the Handover Management (HOM) of the resources is performed.

These functions are enabled using various existing profile architectures in the wireless communication network. Two of these profile architectures are the profile A (centralized) and the profile C (distributed) architectures. The profile A is a centralized architecture where the ASN-controller includes an RRC and a BS in the wireless communication network includes a Radio Resource Agent (RRA). A RRA reports about the spare capacity and PHY requirements of the corresponding BS to the RRC in the ASN-controller. Based on the information, the RRC performs RRM and HOM in a centralized manner. However, the profile A results in heavy overloading of the ASN-controller. Additionally, the profile A architecture is less efficient in catering services of many vendors in the wireless communication network to the one or more MSs because this overloads the ASN-controller.

Contrary to the profile A, the profile C is a distributed architecture where each BS of the plurality of BSs includes a RRC operatively coupled with an RRA. The ASN-controller includes a Radio Resource Relay (RRR). In the Profile C, a RRC in a BS interacts only with one or more RRCs in one or more neighboring BSs. This interaction may be facilitated by the RRR in the ASN-GW. Therefore, a BS in the profile C architecture only has information (for example, spare capacity) corresponding to one or more neighboring BSs. As a result of this, during a handover, a BS may be simultaneously transferred load by two BS. The two BSs are neighbors of the BS but do not interact with each other. This may result in over-loading the BS, which earlier had spare capacity.

In another scenario, a BS is overloaded and corresponding one or more neighboring BSs do not have any spare capacity. As a result, the BS may remain overloaded as the BS is not able to handover one or more MSs to the one or more neighboring BSs. Additionally, the profile C architecture requires extra backhauls for the transfer of information between BSs served by the ASN-controller in the wireless communication network.

There is a therefore, a need for a method and system for communication in the wireless communication network using an architecture which facilitates communication between the BSs served by ASN-controller by avoiding overload at the ASN gateway. Also the method and system should facilitate efficient load balancing amongst the BSs without using extra backhauls.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
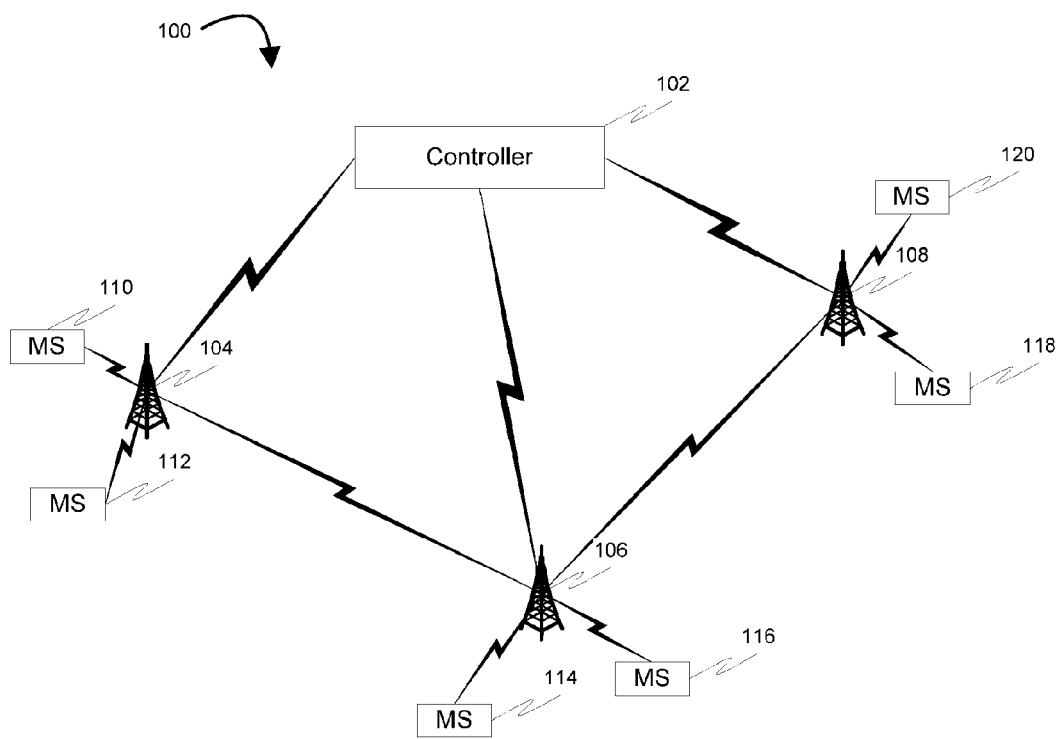
FIG. 1 is a block diagram showing a wireless communication network in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to method and apparatus for load balancing in a wireless communication network. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . .a" does not, without more constraints, preclude the existence of additional identical elements in the process, method, article, or apparatus that comprises the element.

It will be appreciated that embodiments described herein may be comprised of one or more conventional processors and unique stored program instructions that control the one or more processors to implement, in conjunction with certain non-processor circuits, some, most, or all of the functions of method and apparatus for load balancing in a wireless communication network described herein. The non-processor circuits may include, but are not limited to, a radio receiver, a radio transmitter, signal drivers, clock circuits, power source circuits, and user input devices. As such, these functions may be interpreted as steps of a method to perform load balancing by communicating in the wireless communication network Various embodiments of the invention provide method, system and apparatus for communication in a wireless communication network having an Access Service Network-controller (ASN-controller) communicating with a plurality of Base Stations (BSs). The method includes reading one or more reports of a plurality of reports received from the plurality of BSs. The plurality of reports include spare capacity information of one or more BSs of the plurality of BSs. The method further includes generating one or more directions based on the one or more reports to perform load balancing.

FIG. 1 is a block diagram showing a wireless communication network 100 in which various embodiments of the invention may function. Examples of wireless communication network 100 may include, but are not limited to a Wireless Interoperability Microwave Access (WiMAX) communication network, a 3rd Generation Partnership Project (3GPP) Long Term Evolution (LTE) network, a 3rd Generation Partnership Project 2 (3GPP2) Ultra Mobile Broadband (UMB) network, a Wireless Fidelity (WiFi) network, and any variant of Orthogonal Frequency Division Multiple Access (OFDMA).

Wireless communication network 100 includes a controller 102. It will be apparent to a person skilled in the art that wireless communication network 100 may include more than one controllers. In an embodiment, if wireless communication network 100 is a WiMAX communication network, controller 102 is an ASN-Controller. Controller 102 communicates with a plurality of BSs (such as, a BS 104, a BS 106, and a BS 108) to perform various functions in wireless communication network 100. Examples of these functions may include, but are not limited to Authorization, Authentication, Accounting (AAA), Portfolio Management, Radio Resource Management (RRM), and Handover Management (HOM).

One or more BSs of the plurality of BSs are capable of communicating with one or more neighboring BSs. For example, BS 104 and BS 106 are neighboring BSs. BS 104 and BS 106 may communicate among each other. The communication between BS 104 and BS 106 may also be relayed through controller 102. Further, the plurality of BSs may communicate with a plurality of Mobile Stations (MSs). For example, BS 104 communicates with a MS 110 and a MS 112, BS 106 communicates with a MS 114 and a MS 116, and BS 108 communicates with a MS 118 and a MS 120. Examples of a MS may include, but are not limited to a hand-held device, a personal computer and a laptop computer using which a subscriber avails various communication services.

Figure 2:
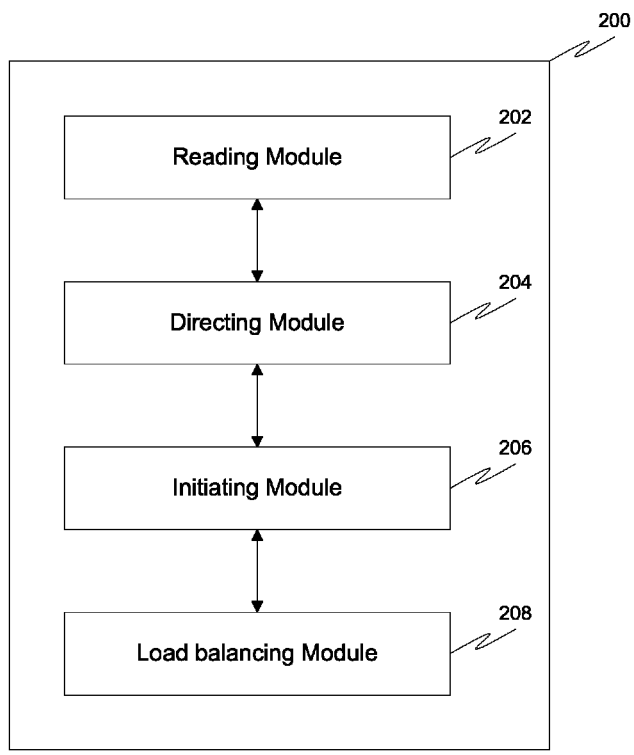
FIG. 2 is a block diagram showing a system for communication in a wireless communication network, in accordance with an embodiment of the invention.

FIG. 2 is a block diagram showing a system 200 for communication in wireless communication network 100, in accordance with an embodiment of the invention. System 200 communicates with a plurality of BSs. The plurality of BSs may send a plurality of reports to system 200. The plurality of reports may include spare capacity information of one or more BSs of the plurality of BSs. The spare capacity information for a BS may include one or more of information about status of neighboring BSs of the BS, amount of extra load on the BS, and current available capacity of the BS. In an embodiment of the invention, wireless communication network 100 may correspond to the profile C network architecture of a WiMAX communication network. In this case, system 200 is located in an ASN-controller. The ASN-controller includes a Radio Resource Relay (RRR). Each of the plurality of BSs includes a Radio Resource Controller (RRC) and a Radio Resource Agent (RRA). In the profile C architecture, a RRC in a BS interacts only with one or more RRCs in one or more neighboring BSs. This interaction may be facilitated by the RRR in the ASN-controller. RRCs and RRAs in the plurality of BSs have one or more information. The one or more information includes, but is not limited to a contextual report, a data path report, a handover report, a spare capacity information, and PHY parameter information of MSs.

The system includes a reading module 202 and a directing module 204. Reading module 202 reads one or more reports of the plurality of reports received from the plurality of BSs. Based on the one or more reports, directing module 204 generates one or more directions to perform load balancing. For example, BS 104 sends a report that includes spare capacity information of BS 104 to controller 102. The spare capacity information includes number of MSs served by BS 104 and current available capacity of BS 104. Based on the report of spare capacity information, direction module may generate a direction for BS 104 to offload one or more MSs, if BS 104 is serving more MSs than the total capacity of BS 104.

In response to the one or more directions generated by directing module 204, an initiating module 206 initiates one or more instructions for one or more BSs of the plurality of BSs. The one or more instructions include one or more of, but are not limited to the number of MSs that can be used to perform load balancing and one or more target BSs to be used for handover. The one or more target BSs may be selected from the plurality of BSs.

In an embodiment of the invention, initiating module 206 may be located in the ASN-controller. In another embodiment of the invention, initiating module 206 may be located in one or more BSs. The one or more BSs may be selected from the plurality of BSs. In this case, each of the one or more BSs may act as master BS. For example, BS 104 is selected as master BS. In this case, BS 104 may receive one or more directions for BS 104, BS 106, and BS 108 to perform load balancing. Thereafter, BS 104 may initiate one or more instructions based on the one or more directions. For example, BS 104 initiates an instruction for BS 106 based on a direction generated for BS 106. The instruction includes information that four MSs should be handovered from BS 106. The instruction further includes information that BS 108 is the target BS which will receive the four MSs handovered from BS 106.

Thereafter, based on the one or more instructions a load balancing module 208 in system 200 executes handover of one or more MSs to the one or more target BSs based on the number of MSs specified in the one or more instructions. Alternatively, load balancing module 208 may also drop one or more MSs based on the number of MSs specified in the one or more instructions. Load balancing module 208 may be located in one or more BSs of the plurality of BSs. This is further explained in detail in conjunction with FIG. 5.

The above mentioned system enables a network entity in wireless communication networks to determine that load balancing is required based on a coarse information extracted from spare capacity reports received from a plurality of BSs. Additionally, in the profile C architecture of the WiMAX communication network, an ASN-controller is enabled to take centralized decisions for performing load balancing for the plurality of BSs. This reduces the possibility of un-proportionate handover between the plurality of BSs in the profile-C architecture.

Figure 3:
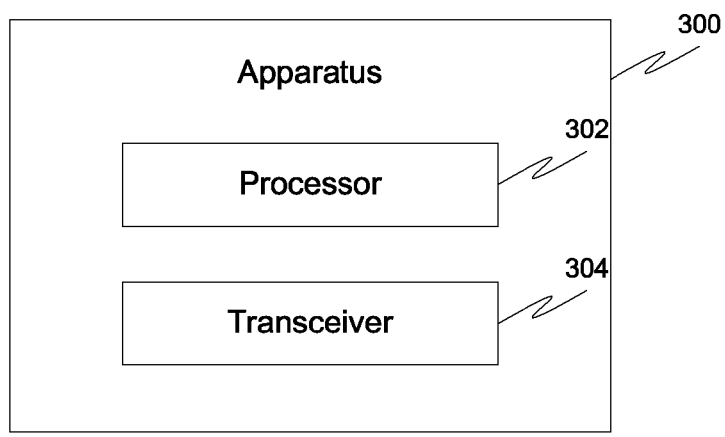
FIG. 3 is a block diagram showing an apparatus for managing communication in a wireless communication network, in accordance with an embodiment of the invention.

FIG. 3 is a block diagram showing an apparatus 300 for managing communication in wireless communication network 100, in accordance with an embodiment of the invention. Apparatus 300 receives a plurality of reports from a plurality of BSs. The plurality of reports may include spare capacity information of one or more BSs of the plurality of BSs. Apparatus 300 includes a processor 302 and a transceiver 304. Processor 302 reads one or more reports of the plurality of reports received from the plurality of BSs. Based on the one or more reports processor 302 generates one or more directions to perform load balancing. Thereafter, transceiver 304 communicates the one or more directions to the one or more BSs. This has been explained in detail in conjunction with FIG. 2.

In an embodiment of the invention, processor 302 further initiates one or more instructions in response to generation of the one or more directions. The one or more instructions are generated for the one or more BSs of the plurality of BSs. This has been explained in detail in conjunction with FIG. 2.

In an embodiment of the invention, apparatus 300 is an ASN-controller, such as, controller 102. In another embodiment of the invention, apparatus 300 is a BS selected from the plurality of BSs. In this case, the BS may act as a master BS. This has been explained in detail in conjunction with FIG. 2.

Figure 4:
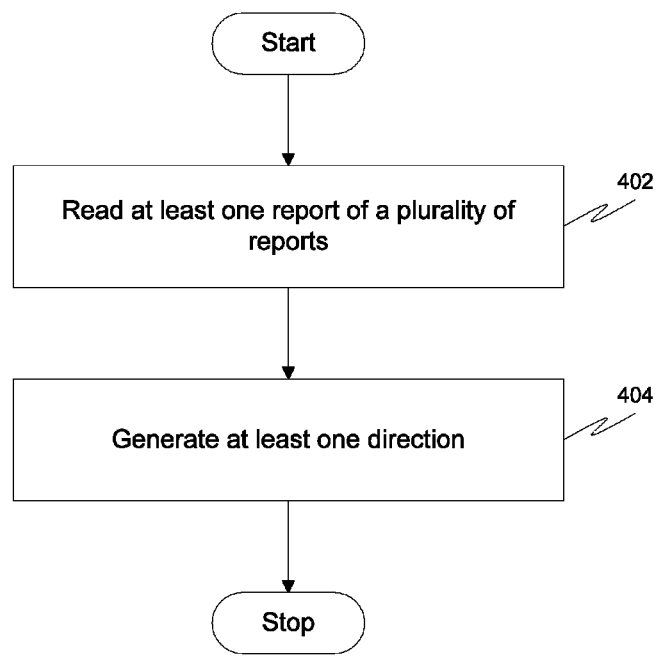
FIG. 4 is a flowchart of a method for communication in a wireless communication network, in accordance with an embodiment of the invention.

FIG. 4 is a flowchart of a method for communication in wireless communication network 100, in accordance with an embodiment of the invention. In an embodiment of the invention, wireless communication network 100 may correspond to the profile C network architecture of a WiMAX communication network. In this case, processor 302 is located in an ASN-controller. Processor 302 communicates with a plurality of BSs. The plurality of BSs send a plurality of reports to processor 302. The plurality of reports include spare capacity information of one or more BSs of the plurality of BSs. The spare capacity information for a BS may include one or more of information about status of neighboring BSs of the BS, amount of extra load on the BS, and current available capacity of the BS.

The plurality of reports may be received in response to one or more requests generated from one or more BSs of the plurality of BSs. For example, BS 104 is overloaded. Therefore, BS 104 generates a request to off load one or more MSs by sending request to the ASN-controller.

At step 402, processor 302 reads one or more reports of the plurality of reports. While reading the one or more reports, processor 302 extracts one or more information from the one or more reports without performing any computation on the one or more reports. For example, processor 302 extracts information from a report sent by BS 104. The information may suggest that BS 104 is overloaded. Thereafter, based on the one or more reports, processor 302 generates one or more directions to perform load balancing at step 404. In an embodiment of the invention, apparatus 300 is an ASN-controller. In this case, step 404 is performed in the ASN-controller. For example, BS 104 sends a report that includes spare capacity information of BS 104 to processor 302. The spare capacity information includes number of MSs served by BS 104. Based on the report, processor 302 may generate a direction for BS 104 to offload one or more MSs, if BS 104 is serving more MSs than the total capacity of BS 104. Further, in response to the one or more directions generated, processor 302 initiates one or more instructions for the one or more BSs of the plurality of BSs to perform load balancing. This is further explained in detail in conjunction with FIG. 5.

Figure 5:
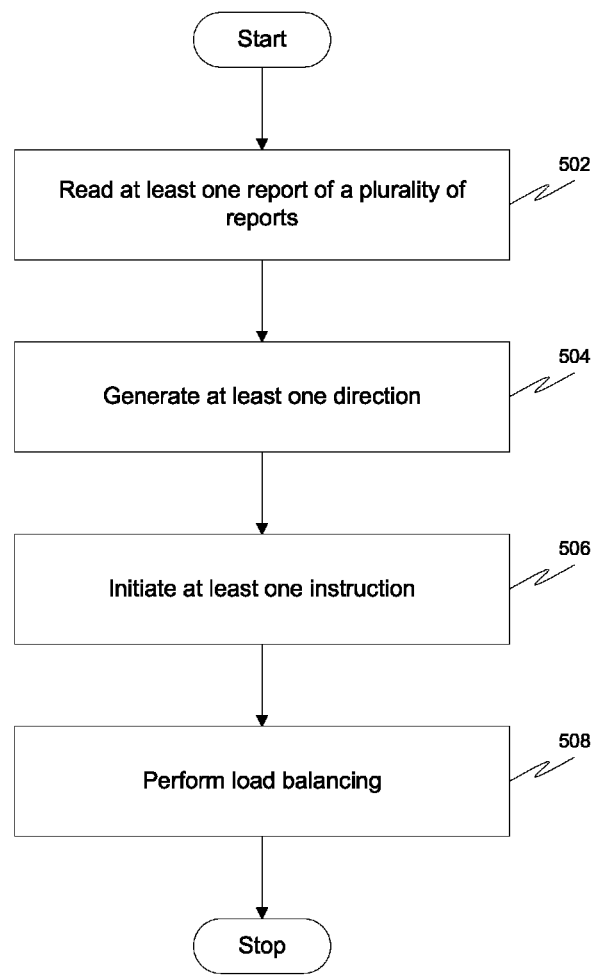
FIG. 5 is a flowchart of a method for performing load balancing in a wireless communication network, in accordance with an embodiment of the invention.

FIG. 5 is a flowchart of a method for performing load balancing in wireless communication network 100, in accordance with an embodiment of the invention. At step 502, processor 302 reads one or more reports of a plurality of reports. Thereafter, based on the one or more reports, processor 302 generates one or more directions to perform load balancing at step 504. This has been explained in detail in conjunction with FIG. 4.

In response to generating the one or more directions, processor 302 initiates one or more instructions for one or more BSs of the plurality of BSs at step 506. The one or more instructions include one or more of, but are not limited to the number of MSs that can be used to perform load balancing and one or more target BSs to be used for handover. The one or more target BSs may be selected from the plurality of BSs.

In an embodiment of the invention, step 506 is performed in the ASN-controller. In another embodiment of the invention, step 506 is performed in one or more BSs. The one or more BSs may be selected from the plurality of BSs. For example, BS 104 sends a report that includes spare capacity information of BS 104 to processor 302. The spare capacity information includes number of MSs served by BS 104. Based on the report, processor 302 may generate a direction for BS 104 to offload four MSs, if BS 104 is serving more MSs than the total capacity of BS 104. In response to the direction received, BS 104 initiates an instruction to perform load balancing by handover four MSs to BS 106.

Further at step 508, processor 302 performs load balancing based on the one or more instructions. In an embodiment of the invention, processor 302 executes handover of one or more MSs to the one or more target BSs based on the number of MSs specified in the one or more instructions. In another embodiment of the invention, processor 302 drops one or more MSs based on the number of MSs specified in the one or more instructions. Referring back to previous example, in order to perform load balancing, BS 104 may drop one MS and handover three MSs to BS 106.

The above mentioned method enables a network entity in wireless communication networks to determine that load balancing is required based on a coarse information extracted from spare capacity reports received from a plurality of BSs. Additionally, in the profile C architecture of the WiMAX communication network, an ASN-controller is enabled to take centralized decisions for performing load balancing for the plurality of BSs. This further reduces the possibility of un-proportionate handover between the plurality of BSs in the profile-C architecture. Further, the method also facilitates the plurality of BSs to perform load balancing based on the decisions from the ASN-controller. This reduces the workload on the plurality of BSs, as the decisions to perform load balancing are taken at the ASN-controller.

Figure 6:
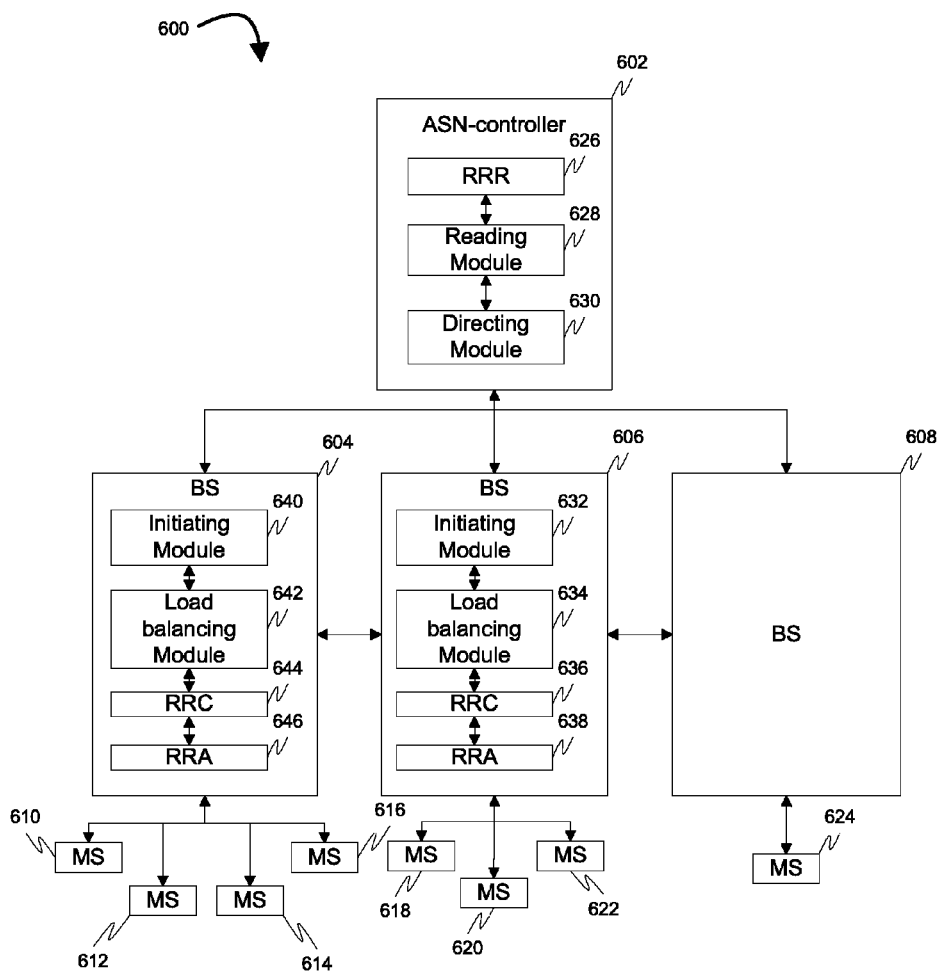
FIG. 6 is a block diagram showing load balancing in a Worldwide Interoperability for Microwave Access (WiMAX) communication network, in accordance with an exemplary embodiment of the invention.

FIG. 6 is a block diagram showing load balancing in a WiMAX communication network 600, in accordance with an exemplary embodiment of the invention. WiMAX communication network 600 is the profile C network architecture. WiMAX communication network 600 includes an ASN-controller 602 that communicates with a BS 604, a BS 606, and a BS 608 to perform various functions in WiMAX communication network 600. Each of BS 604, BS 606, and BS 608 is capable of communicating with their neighboring BSs. As BS 604 and BS 608 are neighboring BSs of BS 606, therefore, BS 606 communicates with BS 604 and BS 608, however, BS 604 and BS 608 are not able to communicate amongst each other. Additionally, BS 604, BS 606, and BS 608 communicate among each other by relaying through ASN-controller 602.

Further, BS 604 communicates with a MS 610, a MS 612, a MS 614, and a MS 616; BS 606 communicates with a MS 618, a MS 620, and a MS 622; and BS 608 communicates with a MS 624. Each of BS 604, BS 606, and BS 608 has a threshold capacity of three MSs each. Therefore, as BS 604 is serving four BS, BS 604 is overloaded with one extra MS. Similarly, BS 606 does not have any spare capacity as BS 606 is serving three BSs, which is the threshold capacity of BS 606, and BS 608 has spare capacity for two MSs. As BS 604 is overloaded, therefore, BS 604 needs to offload one extra MS to a neighboring BS, i.e., BS 606. However, as BS 606 is already serving to the threshold capacity of BS 606, therefore, BS 604 cannot offload the extra MS to BS 606. Additionally, BS 608 has spare capacity to serve two MSs in addition to MS 624.

ASN-controller 602 includes a Radio Resource Relay (RRR) 626, a reading module 628, and a directing module 630. RRR 626 receives reports from BS 604, BS 606, and BS 608. The reports include spare capacity information of BS 604, BS 606, and BS 608. Thereafter, RRR 626 relays the reports to the reading module 628. Reading module 628 reads the reports. Based on the reports, reading module 628 determines that BS 604 is overloaded and BS 608 can serve two extra MSs in addition to MS 624. Thereafter, directing module 630 generates directions to perform load balancing in WiMAX communication network 600. ASN-controller 602 sends the directions to BS 604, BS 606, and BS 608.

In order to perform load balancing, BS 606 needs to handover one MS to BS 608 to create spare capacity for an MS in BS 608, such that BS 604 is able to handover one MS to BS 606. Therefore, initiating module 632 in BS 606 initiates a first instruction in response to the directions from ASN-controller 602. The first instruction indicates that one MS served by BS 606 needs to be offloaded to BS 608, which is specified as target BS. Similarly, initiating module 640 in BS 604 initiates a second instruction in response to the directions from ASN-controller 602. The second instruction indicates that one MS served by BS 604 needs to be offloaded to BS 606, which is specified as target BS. In response to the first instruction, a load balancing module 634 in BS 606 communicates with a RRC 636 and a RRA 638 in BS 606. RRC 636 and RRA 638 decide that MS 622 needs to be offloaded based on PHY parameter information of MS 618, MS 620, and MS 622. Similarly in response to the second instruction, a RRC 644 and a RRA 646 in BS 604 decide that MS 616 needs to be offloaded.

Thereafter, load balancing module 634 handovers MS 622 to BS 608, and load balancing module 642 handovers MS 616 to BS 606. Now after load balancing, each of BS 604 and BS 606 serve three MSs each and BS 608 serves two MSs. Thereby, overloading of each of BS 604, BS 606, and BS 608 is avoided. It will be apparent to a person skilled in the art that though not depicted, BS 608 also includes an initiating module, a load balancing module, a RRC and a RRA.

Various embodiments of the invention provide method, system and apparatus for communication in a wireless communication networks. In this system, a network entity is enabled to determine that load balancing is required based on a coarse information extracted from spare capacity reports received from a plurality of BSs. Additionally, in the profile C architecture of the WiMAX communication network, an ASN-controller is enabled to take centralized decisions for performing load balancing for the plurality of BSs. This further reduces the possibility of un-proportionate handover between the plurality of BSs in the profile C architecture. Further, various embodiments of the invention also facilitates the plurality of BSs to perform load balancing based on the decisions from the ASN-controller. This reduces the workload of the plurality of BSs as the decisions to perform load balancing are made at the ASN-controller.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the dependency of this application and all equivalents of those claims as issued.

What is claimed is:

1. A method of communicating in a wireless communication network, the method comprising:
   reading at least one report of a plurality of reports received from a plurality of Base Stations (BSs) in the wireless communication network, the plurality of reports including spare capacity information of the plurality of BSs; and
   generating at least one direction based on the reading of the at least one report and the spare capacity information of the plurality of BSs, the at least one direction providing instructions to offload one or more Mobile Stations (MSs) and to perform load balancing.

2. The method of claim 1, wherein the at least one direction is generated in an ASN-controller in communication with the plurality of BSs in the wireless communication network.

3. The method of claim 1 further comprising initiating at least one instruction for at least one BS of the plurality of BS in response to generating the at least one direction.

4. The method of claim 3, wherein the at least one instruction is initiated in an ASN-controller in communication with the plurality of BSs in the wireless communication network.

5. The method of claim 3, wherein the at least one instruction is initiated in at least one BS of the plurality of BSs.

6. The method of claim 3, wherein the at least one instruction includes at least one of:

number of Mobile Stations (MSs) for performing load balancing and at least one target BS selected from the plurality of BSs for a handover.

7. The method of claim 6, wherein the load balancing is performed by executing handover of at least one MS to the at least one target BS based on the number of MSs.

8. The method of claim 6, wherein the load balancing is performed by dropping at least one MS based on the number of MSs.

9. The method of claim 1, wherein the plurality of reports are received in response to at least one request generated from at least one BS of the plurality of BSs.

10. The method of claim 1, wherein the wireless communication network corresponds to a profile-c network architecture of a Worldwide Interoperability Microwave Access (WiMAX) communication network.

11. The method of claim 1, wherein the communicating is performed in a manner consistent with a protocol according to one of a WiMAX communication network, a 3rd Generation Partnership Project (3GPP) Long Term Evolution (LTE) network, a 3rd Generation Partnership Project 2 (3GPP2) Ultra Mobile Broadband (UMB) network, a Wireless Fidelity (WiFi) network or an Orthogonal Frequency Division Multiple Access (OFDMA) communication network having a backhaul link.

12. A system for communicating in a wireless communication network, the system comprising:
a reading module configured to read at least one report of a plurality of reports received from a plurality of BSs in the communication network, the plurality of reports including spare capacity information of the plurality of BSs; and
a directing module configured to generate at least one direction based on the at least one report read and the spare capacity information of the plurality of BSs, the at least one direction providing instructions to offload one or more Mobile Stations (MSs) and to perform load balancing.

13. The system of claim 12, wherein the system further comprises an initiating module configured to initiate at least one instruction for at least one BS of the plurality of BS in response to generating the at least one direction.

14. The system of claim 13, wherein the at least one instruction includes at least one of a number of Mobile Stations (MSs) for performing the load balancing and at least one target BS selected from the plurality of BSs for a handover.

15. The system of claim 14, wherein the system further comprises a load balancing module configured to perform at least one of:
executing handover of at least one MS to the at least one target BS based on the number of MSs; and
dropping at least one MS based on the number of MSs.

16. An apparatus in a wireless communication network, the apparatus comprising:
a processor configured to:
read at least one report of a plurality of reports received from a plurality of BSs, the plurality of reports including spare capacity information of the plurality of BSs;
generate at least one direction based on the at least one report read and the spare capacity information of the plurality of BSs, the at least one direction providing instructions to offload one or more Mobile Stations (MSs) and to perform load balancing; and
a transceiver configured to communicate the at least one direction to at least one BS of the plurality of BSs.

17. The apparatus of claim 16, wherein the processor is further configured to initiate at least one instruction for the at least one BS of the plurality of BS in response to generating the at least one direction.

18. The apparatus of claim 16, wherein the apparatus is an ASN-controller.

19. The apparatus of claim 16, wherein the apparatus is a BS selected from the plurality of BSs.

20. The method of claim 1, wherein the spare capacity information includes a number of MSs served by a respective BS of the plurality of BSs.

* * * * *